UNITED STATES PATENT OFFICE.

PAUL ALTENFELD, OF NEW YORK, N. Y.

PROCESS OF MAKING A FERMENT.

1,105,601. Specification of Letters Patent. Patented Aug. 4, 1914.

No Drawing. Application filed February 11, 1913. Serial No. 747,710.

*To all whom it may concern:*

Be it known that I, PAUL ALTENFELD, a citizen of the United States, residing at New York, in the county of New York and State of New York, have invented certain new and useful Improvements in Processes of Making a Ferment, of which the following is a full, clear, and exact description, such as will enable others skilled in the art to which it appertains to make and use the same.

This invention relates to processes of making ferments and similar substances, and with respect to its more specific features, to processes of the character referred to more especially adapted to make ferments suitable for use in the preparation of food, more particularly food for horses, cattle and other animals.

One of the objects of this invention is the provision of a simple and efficient process for producing a ferment in a relatively short space of time.

Another object of the invention is the provision of a practical process for the production of a ferment which is suitable for use in the preparation of animal foods and which may be cheaply made at a relatively small cost.

Other objects will be in part obvious and in part pointed out hereinafter.

The invention accordingly consists in the several steps and the relation and order of one or more of such steps with relation to each of the others thereof, which will be exemplified in the hereinafter disclosed process, and the scope of the application of which will be indicated in the claims that follow.

In carrying out the improved process a suitable nutritious grain is selected and disintegrated, or reduced to a relatively fine condition, as by crushing or grinding. It is found that rye possesses especially efficacious characteristics when utilized in the herein-described process, hence rye is the grain preferably employed. The crushed or ground rye is mixed with malt, the latter having also been preferably reduced to a fine condition by crushing or grinding, and preferably also three parts of rye to one of malt are employed. To the above substances are added elements of corn or other farinaceous substance, the same being particularly efficacious, especially when in the form of corn flakes, *i. e.*, the product prepared by steaming, rolling and drying corn grits or meal, also called hominy, as the expedition of the fermentation is facilitated on account of the gelatinized condition of the starch of the corn-flakes. A suitable quantity of water is added to the rye, malt and corn flakes, and the better results have been secured by using one part of corn flakes and four parts of water, in connection with the proportions of rye and malt before stated. The ingredients referred to are then worked or kneaded into a dough or pasty mass, and then allowed to set for a sufficient time and during which fermentation will occur. The time taken to ferment sufficiently to complete the process varies with the temperature and general surrounding conditions, but if set in a relatively warm place the fermentation will be completed in about twelve hours, though under some adverse conditions this part of the process may consume eighteen hours. The resulting product or ferment may be employed to cause fermentation when added to other suitable substances, as for instance when mixed with suitable kinds of grains, molasses, oil meal, salt, and a required amount of water. The dough formed from this latter admixture should preferably be of such consistency as to be readily operated upon by the ordinary dividing or chopping machine, in which it will be formed into short lengths. It preferably should then be dried at a temperature sufficiently high to sterilize it, a temperature of 168° F. being preferred.

It is characteristic of the product made with the improved ferment, that it is extremely rich in nutritive values, the concentration and development of the nutritive values being carried out to the utmost.

The addition of the ferment or mash resulting from the first part of the herein-described process to molasses, salt, oil meal, etc., results in the production of a nutritious food especially suitable for use after fermentation, as will be understood, but it will be noted that that part of the process directed to the production of the ferment "*per se*," is complete in itself, and results in a product which merely has to be added to other suitable substances in order to cause fermentation under proper conditions.

Thus by the above described process are accomplished, among others, the objects hereinbefore referred to.

As many changes could be made in carrying out the above process without departing from the scope of the invention, it is intended that all matter contained in the above description shall be interpreted as illustrative and not in a limiting sense.

Having described my invention, what I claim as new and desire to secure by Letters Patent is:

1. A process of making a ferment which consists in forming a dough comprising malt and a gelatinized grain, and allowing the dough to ferment at a relatively low temperature.

2. A process of making a ferment which consists in forming a dough comprising malt, rye and corn-flakes, and allowing the dough to ferment.

3. A process of making a ferment which consists in forming a dough of malt, rye, corn-flakes and water, and allowing the dough to ferment at a relatively low temperature.

4. A process of making a ferment which consists in mixing malt and rye each in a disintegrated condition, adding thereto corn-flakes and sufficient water to form a dough, and allowing the dough to set.

5. A process of making a ferment which consists in mixing malt and rye each in a disintegrated condition, adding thereto corn-flakes and sufficient water to form a dough, and allowing the dough to set from approximately twelve to eighteen hours at a relatively low temperature.

6. A process of making a ferment which consists in mixing one part of malt and three parts of rye each in a disintegrated condition, adding thereto one part of corn-flakes and four parts of water to form a dough, and allowing the dough to set at a relatively low temperature and thereby ferment.

7. A process of making a ferment which consists in forming a dough comprising malt and a gelatinized farinaceous substance, and allowing the dough to ferment at a relatively low temperature.

In testimony whereof I affix my signature, in the presence of two witnesses.

PAUL ALTENFELD.

Witnesses:
J. W. ANDERSON,
C. J. KULBERG.